(12) United States Patent
Robertson

(10) Patent No.: US 8,214,804 B2
(45) Date of Patent: Jul. 3, 2012

(54) SYSTEM AND METHOD FOR ASSIGNING COMPUTER USERS TO TEST GROUPS

(75) Inventor: Ian B. Robertson, Salt Lake City, UT (US)

(73) Assignee: Overstock.com, Inc., Salt Lake City, UT (US)

( * ) Notice: Subject to any disclaimer, the term of this patent is extended or adjusted under 35 U.S.C. 154(b) by 1167 days.

(21) Appl. No.: 12/014,007

(22) Filed: Jan. 14, 2008

(65) Prior Publication Data

US 2009/0183084 A1  Jul. 16, 2009

Related U.S. Application Data

(63) Continuation-in-part of application No. 12/006,275, filed on Dec. 31, 2007, now abandoned.

(51) Int. Cl.
G06F 9/44 (2006.01)
(52) U.S. Cl. ...................................... 717/124
(58) Field of Classification Search .................. 717/124
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,412,287 A | 10/1983 | Braddock, III | |
| 4,674,044 A | 6/1987 | Kalmus et al. | |
| 4,677,552 A | 6/1987 | Sibley, Jr. | |
| 4,789,928 A | 12/1988 | Fujisaki | |
| 4,799,156 A | 1/1989 | Shavit et al. | |
| 4,808,987 A | 2/1989 | Takeda et al. | |
| 4,823,265 A | 4/1989 | Nelson | |
| 4,854,516 A | 8/1989 | Yamada | |
| 4,903,201 A | 2/1990 | Wagner | |
| RE33,316 E | 8/1990 | Katsuta et al. | |
| 5,027,110 A | 6/1991 | Chang et al. | |
| 5,053,956 A | 10/1991 | Donald et al. | |
| 5,063,507 A | 11/1991 | Lindsey et al. | |

(Continued)

FOREIGN PATENT DOCUMENTS

CA 2253543 10/1997

(Continued)

OTHER PUBLICATIONS

Berger et al. "Random Multiple-Access Communication and Group Testing"; IEEE; 1984.*

(Continued)

*Primary Examiner* — Wei Zhen
*Assistant Examiner* — Junchun Wu
(74) *Attorney, Agent, or Firm* — Clayton, Howarth & Cannon, P.C.

(57) ABSTRACT

A system and method to efficiently and randomly place users into a test group associated with a test running on a website being hosted on a server is disclosed. When a user first accesses the website, a random value is transmitted to the user in such a manner that the random value is stored in a computer-readable memory local to the user. Each subsequent time the user accesses the website, the random value is returned to the server from the user. The server may then place the user into a test group for a test to which the user will be exposed on the website based upon the result of an operation that includes the random value received from the user and a unique test value previously associated with the test.

27 Claims, 3 Drawing Sheets

U.S. PATENT DOCUMENTS

| | | | |
|---|---|---|---|
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foladare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,908 B1 | 3/2002 | Brown et al. |
| 6,366,899 B1 | 4/2002 | Kernz |
| 6,370,527 B1 | 4/2002 | Singhal |
| 6,373,933 B1 | 4/2002 | Sarkki et al. |
| 6,374,260 B1 | 4/2002 | Hoffert et al. |
| 6,381,510 B1 | 4/2002 | Amidhozour et al. |
| 6,415,320 B1 | 7/2002 | Hess et al. |
| 6,434,556 B1 | 8/2002 | Levin et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 * | 2/2003 | Colborn ................. 700/286 |
| 6,523,037 B1 | 2/2003 | Monahan et al. |
| 6,601,061 B1 | 7/2003 | Holt et al. |
| 6,604,107 B1 | 8/2003 | Wang |
| 6,625,764 B1 * | 9/2003 | Dawson ................. 714/715 |
| 6,643,696 B2 | 11/2003 | Davis et al. |
| 6,665,838 B1 | 12/2003 | Brown et al. |
| 6,701,310 B1 | 3/2004 | Sugiura et al. |
| 6,718,536 B2 * | 4/2004 | Dupaquis ................. 717/126 |
| 6,728,704 B2 | 4/2004 | Mao et al. |
| 6,732,161 B1 | 5/2004 | Hess et al. |
| 6,732,162 B1 | 5/2004 | Wood et al. |
| 6,856,963 B1 | 2/2005 | Hurwitz |
| 6,889,054 B2 | 5/2005 | Himmel et al. |
| 7,076,453 B2 | 7/2006 | Jammes et al. |
| 7,100,111 B2 | 8/2006 | McElfresh et al. |
| 7,100,195 B1 * | 8/2006 | Underwood ................. 726/2 |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,254,547 B1 * | 8/2007 | Beck et al. ................. 705/14.41 |
| 7,340,249 B2 | 3/2008 | Moran et al. |
| 7,349,668 B2 | 3/2008 | Ilan et al. |
| 7,366,755 B1 * | 4/2008 | Cuomo et al. ................. 709/204 |
| 7,380,217 B2 | 5/2008 | Gvelesiani |
| 7,454,464 B2 | 11/2008 | Puthenkulam et al. |

| | | | |
|---|---|---|---|
| 7,493,521 B1 * | 2/2009 | Li et al. ............ 717/124 | |
| 7,496,582 B2 | 2/2009 | Farnham et al. | |
| 7,653,573 B2 | 1/2010 | Hayes, Jr. et al. | |
| 2001/0034667 A1 | 10/2001 | Petersen | |
| 2001/0034668 A1 | 10/2001 | Whitworth | |
| 2001/0044751 A1 | 11/2001 | Pugliese et al. | |
| 2001/0047290 A1 | 11/2001 | Petras et al. | |
| 2001/0051996 A1 | 12/2001 | Cooper et al. | |
| 2002/0002513 A1 | 1/2002 | Chiasson | |
| 2002/0022995 A1 | 2/2002 | Miller et al. | |
| 2002/0023059 A1 | 2/2002 | Bari et al. | |
| 2002/0026390 A1 | 2/2002 | Ulenas et al. | |
| 2002/0029187 A1 | 3/2002 | Meehan et al. | |
| 2002/0042738 A1 | 4/2002 | Srinivasan et al. | |
| 2002/0099602 A1 | 7/2002 | Moskowitz et al. | |
| 2002/0107718 A1 | 8/2002 | Morrill et al. | |
| 2002/0129282 A1 | 9/2002 | Hopkins | |
| 2002/0147625 A1 | 10/2002 | Kolke, Jr. | |
| 2002/0161648 A1 | 10/2002 | Mason et al. | |
| 2002/0198784 A1 | 12/2002 | Shaak et al. | |
| 2003/0004855 A1 | 1/2003 | Dutta et al. | |
| 2003/0009392 A1 | 1/2003 | Perkowski | |
| 2003/0036914 A1 | 2/2003 | Fitzpatrick et al. | |
| 2003/0041008 A1 | 2/2003 | Grey et al. | |
| 2003/0046149 A1 | 3/2003 | Wong | |
| 2003/0069740 A1 | 4/2003 | Zeidman | |
| 2003/0088467 A1 * | 5/2003 | Culver ............ 705/14 | |
| 2003/0088511 A1 | 5/2003 | Karboulonis et al. | |
| 2003/0093331 A1 | 5/2003 | Childs et al. | |
| 2003/0110100 A1 | 6/2003 | Wirth, Jr. | |
| 2003/0131095 A1 | 7/2003 | Kumhyr et al. | |
| 2003/0139969 A1 | 7/2003 | Scroggie et al. | |
| 2003/0158792 A1 | 8/2003 | Perkowski | |
| 2003/0163340 A1 | 8/2003 | Fitzpatrick et al. | |
| 2003/0167213 A1 | 9/2003 | Jammes et al. | |
| 2003/0217002 A1 | 11/2003 | Enborg | |
| 2004/0006509 A1 | 1/2004 | Mannik et al. | |
| 2004/0015416 A1 | 1/2004 | Foster et al. | |
| 2004/0055017 A1 | 3/2004 | Delpuch et al. | |
| 2004/0078388 A1 | 4/2004 | Melman | |
| 2004/0128320 A1 | 7/2004 | Grove et al. | |
| 2004/0172379 A1 | 9/2004 | Mott et al. | |
| 2004/0174979 A1 | 9/2004 | Hutton et al. | |
| 2004/0204991 A1 | 10/2004 | Monahan et al. | |
| 2004/0249727 A1 | 12/2004 | Cook, Jr. et al. | |
| 2005/0021666 A1 | 1/2005 | Dinnage et al. | |
| 2005/0038733 A1 | 2/2005 | Foster et al. | |
| 2005/0044254 A1 | 2/2005 | Smith | |
| 2005/0060664 A1 | 3/2005 | Rogers | |
| 2005/0097204 A1 | 5/2005 | Horowitz et al. | |
| 2005/0131837 A1 | 6/2005 | Sanctis et al. | |
| 2005/0198031 A1 * | 9/2005 | Pezaris et al. ............ 707/9 | |
| 2005/0203888 A1 | 9/2005 | Woosley et al. | |
| 2005/0273378 A1 | 12/2005 | MacDonald-Korth et al. | |
| 2006/0009994 A1 | 1/2006 | Hogg et al. | |
| 2006/0031240 A1 | 2/2006 | Eyal et al. | |
| 2006/0041638 A1 | 2/2006 | Whittaker et al. | |
| 2006/0058048 A1 | 3/2006 | Kapoor et al. | |
| 2006/0069623 A1 | 3/2006 | MacDonald Korth et al. | |
| 2006/0085251 A1 | 4/2006 | Greene | |
| 2006/0173817 A1 | 8/2006 | Chowdhury et al. | |
| 2006/0271671 A1 * | 11/2006 | Hansen ............ 709/224 | |
| 2007/0073641 A1 | 3/2007 | Perry et al. | |
| 2007/0078726 A1 | 4/2007 | MacDonald Korth et al. | |
| 2007/0245013 A1 | 10/2007 | Saraswathy et al. | |
| 2008/0140765 A1 * | 6/2008 | Kelaita et al. ............ 709/203 | |
| 2009/0204848 A1 * | 8/2009 | Kube et al. ............ 714/25 | |

FOREIGN PATENT DOCUMENTS

| | | |
|---|---|---|
| CA | 2347812 | 5/2000 |
| EP | 0636993 | 4/1999 |
| EP | 0807891 | 5/2000 |
| EP | 1241603 | 3/2001 |
| JP | 2001283083 | 10/2001 |
| WO | 97/17663 | 5/1997 |
| WO | 98/32289 | 7/1998 |
| WO | 98/47082 | 10/1998 |
| WO | 99/59283 | 11/1999 |
| WO | 00/25218 | 5/2000 |

OTHER PUBLICATIONS

Chen et al. "Detecting Web Page Structure for Adaptive Viewing on Samll Form Factor Devices"; ACM; May 20-24, 2003.*

2ROAM, Inc., multiple archived pages of www.2roam.com retrieved via Internet Archive Wayback Machine on Jun. 10, 2008.

Alt et al., "Bibliography on Electronic Commerce," Electronic Markets—The International Journal, Oct. 1993, 5 pages, vol. 3, No. 3.

Alt et al., "Computer Integrated Logistics," Electronic Markets—The International Journal, Oct. 1993, 1 page, vol. 3, No. 3.

Auctionwatch.com, multiple pages—including search results for "expedition," printed Apr. 21, 2001.

Auctiva.com, multiple pages, undated but website copyright date is "1999-2000."

Braganza, "IS Research at Cranfield—A Look at the Future," Electronic Markets—The International Journal, Oct. 1993, 1 page, vol. 3, No. 3.

Brecht et al., "The IM 2000 Research Programme," Electronic Markets—The International Journal, Oct. 1993, 1 page, vol. 3, No. 3.

Business Wire business editors/high-tech writers, "2Roam Partners With Pumatech to Delivery Wireless Alerts," Business Wire, Dec. 18, 2000.

Business Wire business editors/high-tech writers, "2Roam Takes eHow's How-to Solutions Wireless: With 2Roam, the Web's One-Stop Source for Getting Things Done is on More Wireless Devices, with Ability to Purchase its Products from Anywhere," Business Wire, Oct. 2, 2000.

Business Wire business editors/high-tech writers, "2Roam Drives Hertz to the Wireless Web; Number One Car Rental Company to Provide Customers Wireless Access From Any Device," Business Wire, Aug. 7, 2001.

Buy.com, www.buy.com homepage, printed Oct. 13, 2004.

Clarke, "Research Programme in Supra-organizational Systems," Electronic Markets—The International Journal, Oct. 1993, 2 pages, vol. 3, No. 3.

Clemons et al., "Evaluating the prospects for alternative electronic securities markets," Proceedings of the twelfth international conference on information systems, New York, New York, United States, pp. 53-64, 1991.

Friendster.com, homepage and "more info" pages, printed Apr. 29, 2004.

Google News archive search for "2Roam marketing" performed over the date range 2000-2003.

Google News archive search for "2Roam SMS" performed over the date range 2000-2008.

Grabowski et al., "Mobile-enabled grid middleware and/or grid gateways," GridLab—A Grid Application Toolkit and Testbed, Work Package 12—Access for Mobile Users, Jun. 3, 2003.

Graham, "The Emergence of Linked Fish Markets in Europe," Electronic Markets—The International Journal, Jul. 1998, 4 pages, vol. 8, No. 2.

Gunthorpe et al., "Portfolio Composition and the Investment Horizon," Financial Analysts Journal, Jan.-Feb. 1994, pp. 51-56.

Halperin, "Toward a Process Handbook for Organizational Coordination Processes," Electronic Markets—The International Journal, Oct. 1993, 1 page, vol. 3, No. 3.

Hess et al., "Computerized Loan Origination Systems: An Industry Case Study of the Electronic Markets Hypothesis," MIS Quarterly, Sep. 1994, pp. 251-275.

IBM, "Anonymous Delivery of Goods in Electronic Commerce," IBM Technical Disclosure Bulletin, Mar. 1996, pp. 363-366, vol. 39, No. 3.

IBM, "Personal Optimized Decision/Transaction Program," IBM Technical Disclosure Bulletin, Jan. 1995, pp. 83-84, vol. 38, No. 1.

IEEE 100—The Authoritative Dictionary of IEEE Standards Terms, Seventh Edition, 2000. Entire book cited; table of contents, source list, and terms beginning with A included. ISBN 0-7381-2601-2.

Ives et al., "Editor's Comments—MISQ Central: Creating a New Intellectual Infrastructure," MIS Quarterly, Sep. 1994, p. xxxv.

Klein, "Information Logistics," Electronic Markets—The International Journal, Oct. 1993, pp. 11-12, vol. 3, No. 3.

Klein, "Introduction to Electronic Auctions," Electronic Markets—The International Journal, Dec. 1997, 4 pages, vol. 7, No. 4.

Kubicek, "The Organization Gap," Electronic Markets—The International Journal, Oct. 1993, 1 page, vol. 3, No. 3.
Kuula, "Telematic Services in Finland," Electronic Markets—The International Journal, Oct. 1993, 1 page, vol. 3, No. 3.
Lalonde, "The EDI World Institute: An International Approach," Electronic Markets—The International Journal, Oct. 1993, 1 page, vol. 3, No. 3.
Lee et al., "Intelligent Electronic Trading for Commodity Exchanges," Electronic Markets—The International Journal, Oct. 1993, 2 pages, vol. 3, No. 3.
Lee et al., "Electronic Brokerage and Electronic Auction: The Impact of IT on Market Structures," Proceedings of the 29th Annual Hawaii International COnference on System Sciences, 1996, pp. 397-406.
Lee, "AUCNET: Electronic Intermediary for Used-Car Transactions," Electronic Markets—The International Journal, Dec. 1997, pp. 24-28, vol. 7, No. 4.
LIVE365 press release, "Live365 to Offer Opt-In Advertising on Its Website," Oct. 15, 2004.
London Business School, "Overture and Google: Internet Pay-Per-Click (PPC) Advertising Options," Mar. 2003.
M2 Presswire, "Palm, Inc.: Palm unveils new web browser optimised for handhelds; HTML browser offers high-speed web-browsing option," Mar. 13, 2002.
Malone et al., "Electronic Markets and Electronic Hierarchies," Communications of the ACM, Jun. 1987, pp. 484-497, vol. 30, No. 6.
Mansell et al., "Electronic Trading Networks: The Route to Competitive Advantage?" Electronic Markets—The International Journal, Oct. 1993, 1 page, vol. 3, No. 3.
Mardesich, "Onsale takes auction gavel electronic," Computer Reseller News, Jul. 8, 1996, pp. 2, 32.
Marteau, "Shop with One Click, Anywhere, Anytime," Information Management and Consulting, 2000, pp. 44-46, vol. 15, No. 4.
Massimb et al., "Electronic Trading, Market Structure and Liquidity," Financial Analysts Journal, Jan.-Feb. 1994, pp. 39-49.
McGinity, "Build Your Weapon," PC Magazine, Apr. 24, 2011, printed from www.pcmag.com/print_article2/0,1217,a%253D3955,00.asp.
Meade, "Visual 360: a performance appraisal system that's 'fun,'" HRMagazine, 44, 7, 118(3), Jul. 1999.
"Mediappraise: Mediappraise Receives National Award for Web-based Technology That Enables Companies to Solve Thorny HR Problem," Dec. 14, 1998.
Medvinsky et al., "Electronic Currency for the Internet," Electronic Markets—The International Journal, Oct. 1993, 2 pages, vol. 3, No. 3.
Metails.com, www.metails.com homepage, printed Oct. 13, 2004.
Microsoft Computer Dictionary, Fifth Edition, front matter and p. 33.
Microsoft Computer Dictionary, Fifth Edition, front matter, back matter, and pp. 479, 486.
Neches, "FAST—A Research Project in Electronic Commerce," Electronic Markets—The International Journal, Oct. 1993, 4 pages, vol. 3, No. 3.
Neo, "The implementation of an electronic market for pig trading in Singapore," Journal of Strategic Information Systems, Dec. 1992, pp. 278-288, vol. 1, No. 5.
O'Mahony, "An X.500-based Product Catalogue," Electronic Markets—The International Journal, Oct. 1993, 2 pages, vol. 3, No. 3.
"Onsale: Onsale Brings Thrill of Auctions and Bargain Hunting Online; Unique Internet retail service debuts with week-long charity auction for the Computer Museum in Boston," May 24, 1995, printed from www.dialogweb.com/cgi/dwclient? dwcommand= DWEB PRINT%20810-489267.
"Onsale joins fry as online shopping picks up speed: Internet Booms," Computer Reseller News, Jun. 5, 1995, p. 73.
Palm, Inc., Palm™ Web Pro Handbook, copyright 2002-2003.

Post et al., "Application of Auctions as a Pricing Mechanism for the Interchange of Electric Power," IEEE Transactions on Power Systems, Aug. 1995, pp. 1580-1584, vol. 10, No. 3.
Preist et al., "Adaptive agents in a persistent shout double auction," International Conference on Information and Computation, Proceedings of the first international conference on Information and computation economies, Oct. 25-28, 1998, Charleston, United States, pp. 11-18.
QUALCOMM, "Brew Developer Support," printed from web.archive.org/web/20020209194207/http://www.qualcomm.com/brew/developer/support/kb/52.html on Aug. 30, 2007.
RCR Wireless News, "Lockheed Martin to use 2Roam's technology for wireless platform," RCR Wireless News, Sep. 10, 2001.
Reck, "Formally Specifying an Automated Trade Execution System," J. Systems Software, 1993, pp. 245-252. vol. 21.
Reck, "Trading-Process Characteristics of Electronic Auctions," Electronic Markets—The International Journal, Dec. 1997, pp. 17-23, vol. 7, No. 4.
RepCheck.com, www.repcheck.com homepage, printed from web.archive.org/web/20020330183132/http://repcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rysavy, "Mobile-commerce ASPs do the legwork," Network Computing, Jan. 22, 2001, p. 71, 6 pgs., vol. 12, No. 2.
Saunders, "AdFlight to Offer WAP Ads," Oct. 17, 2000, printed from clickz.com/487531/print.
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Siegmann, "Nowhere to go but up," PC Week, Oct. 23, 1995, 3 pages, vol. 12, No. 42.
Telephony Staff, "Air-ASP," Telephony Online, Oct. 2, 2000, 3 pages.
Teo, "Organizational Factors of Success in Using EDIS: A Survey of Tradenet Participants," Electronic Markets—The International Journal, Oct. 1993, 2 pages, vol. 3, No. 3.
Tjostheim et al., "A case stud of an on-line auction for the World Wide Web," printed from www.nr.no/gem/elcom/publikasjoner/enter98e.html on Jun. 10, 1999, 10 pages.
Turban, "Auctions and Bidding on the Internet: An Assessment," Electronic Markets—The International Journal, Dec. 1997, 5 pages, vol. 7, No. 4.
UBid.com, "How do I Update my Address, Phone, Credit Card, Password, etc.?" printed from web.archive.org/web/20010208113903/www.ubid.com/help/topic13.asp on Aug. 30, 2007.
UBid.com, "How do I track my shipment?" printed from web.archive.org/web/20010331032659/www.ubid.com/help/topic27.asp on Aug. 30, 2007.
UBid.com, "Can I track all my bids from My Page?" printed form web.archive.org/web/20010208114049/www.ubid.com/help/topic14.asp on Aug. 30, 2007.
Van Heck et al., "Experiences with Electronic Auctions in the Dutch Flower Industry," Electronic Markets—The International Journal, Dec. 1997, 6 pages, vol. 7, No. 4.
Verizon Wireless, "Verizon Wireless Customers Get It NowSM; Get Games, Get Pix, Get Ring Tones and Get Going in Full Color," press release to PRNewswire, Sep. 23, 2002.
Warbelow et al., "AUCNET: TV Auction Network System," Harvard Business School 9-190-001, Jul. 19, 1989, rev. Apr. 12, 1996, pp. 1-15.

Weber, "How Financial Markets are Going On-line," Electronic Markets—The International Journal, Oct. 1993, 2 pages, vol. 3, No. 3.

Wireless Internet, "DailyShopper Selects 2Roam to Enable Mobile Customers to Retrieve Nearby Sales and Promotions Information," Wireless Internet, Apr. 2001.

Wireless Week, "Verizon Wireless Gets Going on BREW Agenda," Wireless Week, Sep. 23, 2002.

Xchanger.net, webpage printed from www.auctiva.com/showcase/as_4sale.asp?uid=xchanger, undated but at least as early as Oct. 12, 2000.

Yu et al., "Distributed Reputation Management for Electronic Commerce," Computational Intelligence, 2002, pp. 535-549, vol. 18, No. 4.

Zetmeir, Auction Incentive Marketing, print of all pages of website found at home.earthlink.net/~bidpointz/ made Oct. 8, 2004.

Zimmermann, "Integration of Financial Services: The TeleCounter," Electronic Markets—The International Journal, Oct. 1993, 1 page, vol. 3, No. 3.

Zwass, "Electronic Commerce: Structures and Issues," International Journal of Electronic Commerce, Fall 1996, pp. 3-23, vol. 1, No. 1.

* cited by examiner

SYSTEM AND METHOD FOR ASSIGNING COMPUTER USERS TO TEST GROUPS

CROSS-REFERENCE TO RELATED APPLICATIONS

This application is a continuation-in-part of U.S. application Ser. No. 12/006,275, filed Dec. 31, 2007, entitled "A System and Method for Assigning Computer Users to Test Groups," which is hereby incorporated by reference herein in its entirety, including but not limited to those portions that specifically appear hereinafter, the incorporation by reference being made with the following exception: In the event that any portion of the above-referenced prior application is inconsistent with this application, this application supercedes said above-referenced prior application.

STATEMENT REGARDING FEDERALLY SPONSORED RESEARCH OR DEVELOPMENT

Not Applicable.

BACKGROUND

1. The Field of the Invention

The present disclosure relates to websites generally, and more particularly, but not necessarily entirely, the present disclosure relates to assigning computer users to test groups for a test running on a website.

2. Description of Related Art

Commercial transactions conducted through electronic communication (e.g., via the World Wide Web), commonly known as "e-commerce," are a significant segment of the global economy. In a typical e-commerce transaction, a computer user, or user, decides upon a good or service that the user is interested in purchasing. The user then initiates access to a retailer's or service provider's e-commerce website via a network, perhaps after conducting a search for the website with a commercial search engine. The user may then purchase the desired product or service in an online transaction from the e-commerce website.

E-commerce websites are increasingly attracting a growing base of users. These users navigate through the myriad of e-commerce websites over the Internet using a web browser running on a computer, typically a desktop or laptop computer. The time spent by users visiting any one e-commerce site is typically very short when compared to a more traditional form of commerce, such as a shopping mall, due to the fact that while some online consumers are shopping for a particular item, other online consumers are simply "surfing" for bargains on interesting items.

Because of the extremely transient nature of users visiting e-commerce websites, an e-commerce website provider goes to great lengths to develop webpages for its website that include various features and design components that are intended to attract users into buying a product on the site. For example, a typical e-commerce webpage may employ various features that are displayed to online consumers, including, but not limited to, special promotions, product recommendations, top sellers, special navigational menus, product and information search features, shopping carts, discounted items, menus, tabs, gift ideas, rewards programs, holiday related items and delivery options.

Due to the limited display area on a given webpage, such as a website's home page, an e-commerce website provider may be challenged to decide which products, promotions, or behaviors to incorporate into the webpage. In some circumstances, an e-commerce website provider simply makes an educated decision as to which products and promotions will most likely be favorably received by online users. In other circumstances, an e-commerce website provider may run a small or large scale test involving different variations of a webpage. For example, each of the different variants of a webpage may display a different special promotion.

To run a test on a webpage, some or all of the users requesting the webpage from a web server are divided into distinct test groups. Each of the test groups is exposed to a different variant of the webpage from that of the other test groups. The e-commerce website provider will then monitor and track the responses of each of the different test groups to the different variants of the webpage. Based on the results of this type of a test, an e-commerce website provider will then deploy, on a wide scale basis, the particular variant of the webpage that achieved the most favorable responses.

Obtaining reliable results from online consumer tests are problematic, however, from a statistical point of view. One such problem arises from the difficulty of assigning the members of an online test population, i.e., the users, into different test groups in a random manner, especially when multiple tests are running on a website. This problem arises from the fact that the identity of users is largely unknown, thereby making it difficult to ensure that the users are randomly assigned to test groups without consuming valuable system resources. It would therefore be an improvement over the prior art to provide an efficient system and method for assigning the members of an online test population, i.e., users, to one or more test groups in a random manner such that errors in the test results are reduced and such that the use of valuable system resources is minimized.

The features and advantages of the disclosure will be set forth in the description that follows, and in part will be apparent from the description, or may be learned by the practice of the disclosure without undue experimentation. The features and advantages of the disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
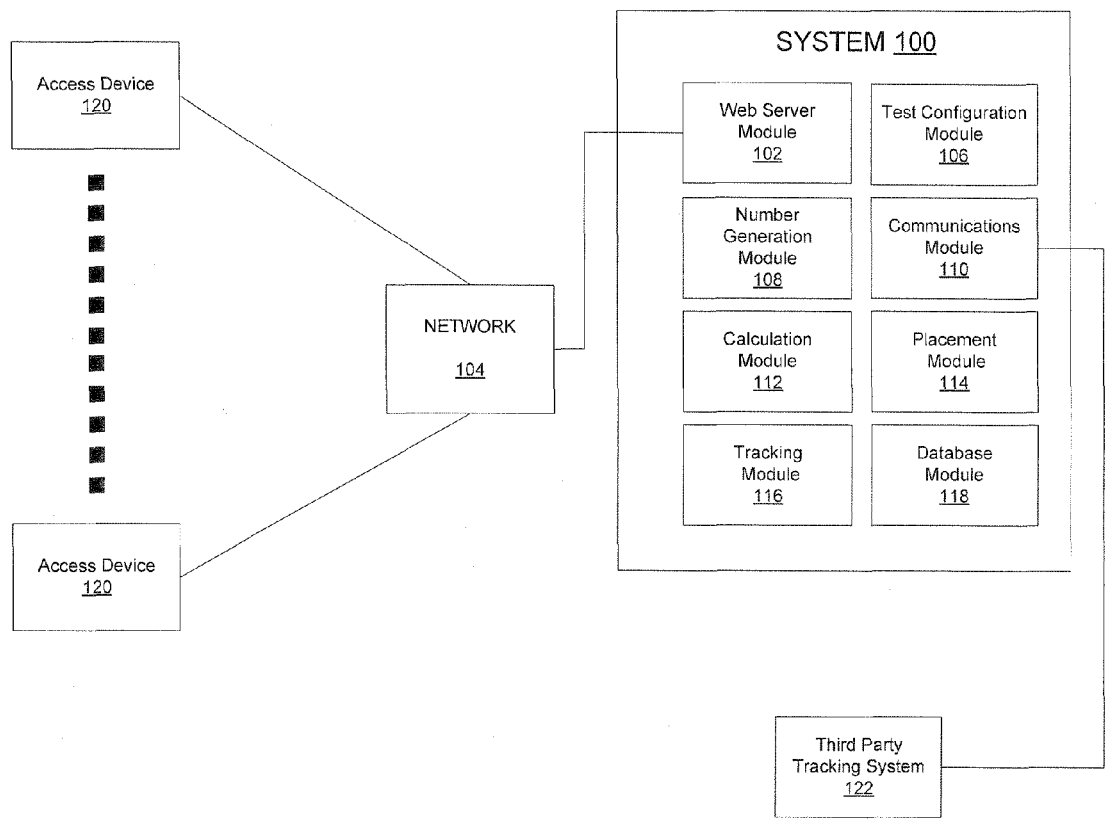
FIG. 1 is a diagram of a system in accordance with an exemplary embodiment of the present invention.

For the purposes of promoting an understanding of the principles in accordance with the disclosure, reference will now be made to the embodiments illustrated in the drawings, and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "having," "containing," "characterized by," and grammatical equivalents thereof are inclusive or open-ended terms that do not exclude additional, unrecited elements or method steps.

Reference throughout this specification to "one embodiment," "an embodiment" or "illustrative embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

It will be appreciated that many of the functional units described in this specification have been labeled as modules, to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code may be a single instruction, or many instructions, and may even be distributed over several different code segments, among different programs, and across several computer memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be appreciated that reference to a computer program may take any form capable of generating a signal, causing a signal to be generated, or causing execution of a program of machine-readable instructions on a digital processing apparatus. A computer program may be embodied by a transmission line, an optical storage medium, digital-video disk, a magnetic tape, a Bernoulli drive, a magnetic disk, a punch card, flash memory, integrated circuits, or other digital processing apparatus memory device.

Referring now to FIG. 1, a system 100 is shown in accordance with an exemplary embodiment of the present invention. The system 100 comprises a plurality of modules that perform the functionality and methods of the present invention as described herein. The primary modules of the system 100 include, but are not limited to: a web server module 102, a test configuration module 106, a number generation module 108, a communications module 110, a calculation module 112, a placement module 114, and a tracking module 116. The system 100 further comprises a database module 118.

The web server module 102 retrieves and delivers requested webpages to users as is known to one having ordinary skill in the art. These users remotely access the web server module 102 through a network 104 using access devices 120. In particular, a user may initiate a request for a webpage hosted on the web server module 102 from a web browser running on an access device 120. The access devices 120 may include, but are not limited to, PCs, PDAs, laptops, hand-held computing devices, web-enabled devices, telephones, and the like. Suitable web browsers may include, but are not limited to, Microsoft Internet Explorer, Netscape Navigator, and the Firefox Web Browser.

Web browsers running on the access devices 120 may be enabled to receive and store cookies from the web server module 102. A cookie is a piece of data, e.g., text, that the web server module 102 can cause to be transmitted to and stored in a computer-readable memory of an access device 120. Typically, the cookies are stored on a hard drive of each of the access devices 120. The information or data contained in the cookies may be arranged as name-value pairs. Once a cookie has been stored on an access device 120, each subsequent time a web browser running on the access device 120 requests a webpage from the web server module 102, the web browser will look in its computer-readable memory for the cookie that was previously sent by the web server module 102. If the web browser finds the cookie, it will return a copy of the cookie to the web server module 102 in conjunction with the request for the webpage. The web server module 102 receives the cookie and uses it to determine, inter alia, if the access device 120 has accessed the web server module 102 previously.

The web server module 102 includes as part of each cookie sent to the access devices 120 a random value. Preferably, this random value is a 64-bit random number. To obtain this random value, the web server module 102 calls the number generation module 108 to generate and provide the random value. The number generation module 108 generates a random value for each of the access devices 120. Due to the wide range of possible random values, each of the access devices 120 will most likely have a unique random value, but not necessarily. As will be explained in more detail hereinafter, these random values are utilized to place the users into test groups. In one embodiment of the present invention, the random value is not generated by the user.

The website hosted on the web server module 102 may be, but is not limited to, an e-commerce website. Further, the website may include a single webpage or a collection of webpages as is known to one having ordinary skill in the art. The data necessary for the website hosted by the web server module 102, including any HTML code, data, images, information, and the like may be stored in the database module 118.

Figure 2:
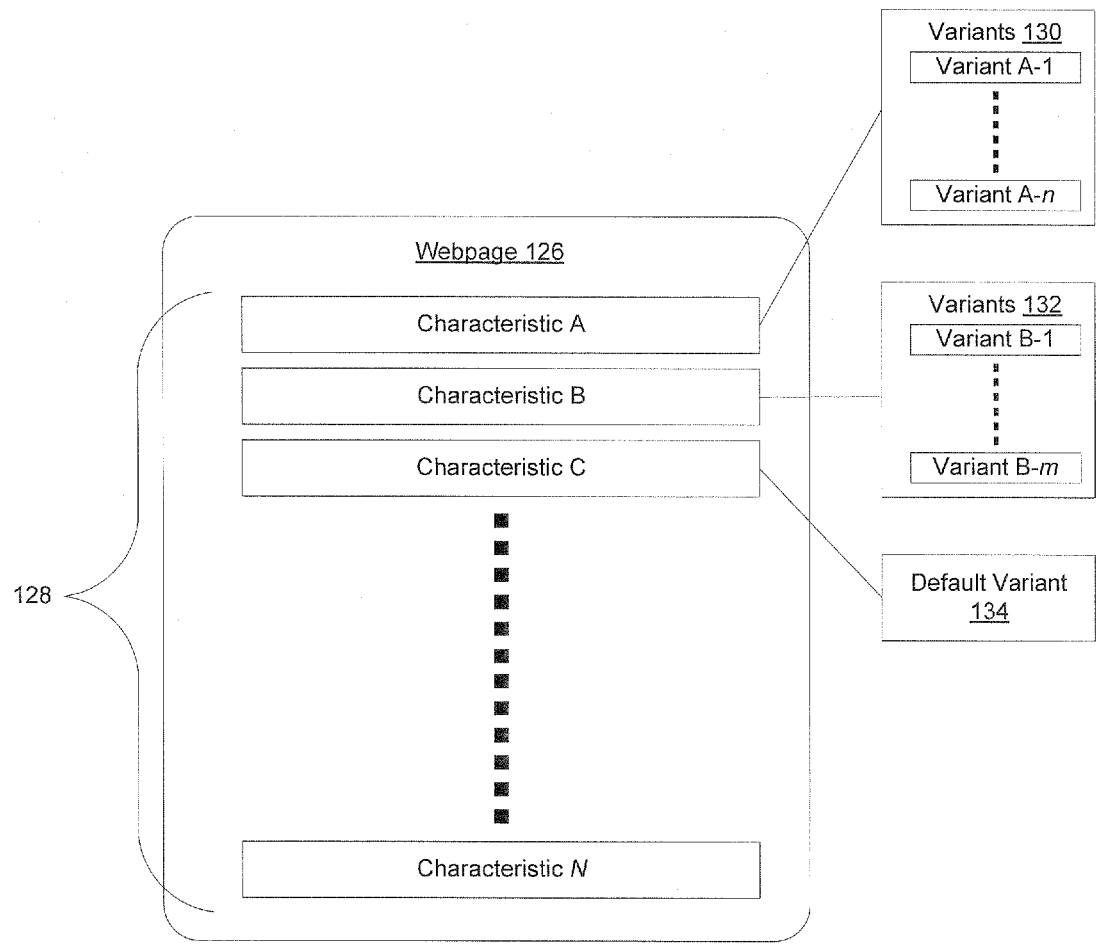
FIG. 2 is a diagram of a webpage in accordance with an exemplary embodiment of the present invention.

Referring now to FIG. 2, there is depicted an exemplary webpage 126 that may be hosted on the web server module 102 shown in FIG. 1. The webpage 126 comprises multiple characteristics 128, individually identified as Characteristic A through Characteristic N. The characteristics 128 of the webpage 126 include, but are not limited to, the layout, content, and behavior of the webpage 126. It will be understood that the characteristics 128 may be interrelated with each other. For example, one of the characteristics 128 may determine whether a banner goes on the top of the webpage 126 or down the right side of the webpage 126 while another one of the characteristics 128 may influence the contents of the banner. Each of the characteristics 128 is defined by the underlying HTML code of the webpage 126. It will be noted that the characteristics 128 of the webpage 126 may be modified or varied from time to time. New characteristics may be added to the webpage 126 from time to time as well.

Each of the characteristics 128 of the webpage 126 may be tested by a provider of the webpage 126. As explained previously, a test allows the website provider to monitor and analyze the reactions from different disjoint groups of users accessing the webpage 126 to different variations of the characteristics 128. Each group of users, referred to herein as a "test group," will be exposed to a different variant of a characteristic being tested. A variant is a particular option for a given characteristic.

An example of a simple testing scenario will now be discussed in relation to FIG. 2. Assume that Characteristic A and Characteristic B are undergoing a test and Characteristic C is not undergoing a test on webpage 126. A user accessing the webpage 126 will be exposed to one of variants 130, individually identified as Variant A-1 through Variant A-n, for Characteristic A and one of variants 132, individually identified as Variant B-1 through Variant B-m, for Characteristic B. Users requesting the webpage 126 will only be shown one variant of each of the variants 130 and 132. The version of the variants 130 and 132 shown to any particular user will be determined based on the test groups to which the user pertains. Since Characteristic C is not undergoing a test, a user requesting the webpage 126 will be exposed to a default variant 134 for Characteristic C.

It will be appreciated that the present invention is able to test any characteristic of a webpage that may be varied. Further, during a test, a single characteristic of a webpage may be tested or multiple characteristics of the webpage may be tested concurrently as part of the same test or different tests.

Referring back to FIG. 1, the manner in which a test is defined and the manner in which the users accessing the web server module 102 are divided into the various test groups of a test will now be explained. The test configuration module 106 allows a provider of the website hosted on the web server module 102 to define the parameters of tests that will be conducted on the website. As explained above, a test may include serving different variants of a characteristic of a webpage to different test groups of users. The overall response of each of the different test groups is then monitored and analyzed to thereby determine which variant achieved the most favorable results.

The test configuration module 106 allows the website provider to define the parameters of one or more tests. The parameters of a test include, but are not limited to, the start and stop dates of a test, the percentage of users accessing the web server module 102 that will be exposed to the test, and the specific characteristic of a webpage that will be subjected to the test and the different variants associated with each characteristic being tested.

Typically, the number of test groups for a given test will correspond in number to the number of variants of the characteristic desired to be tested. That is, each variant of a characteristic being tested is associated to a particular test group and each user belonging to that particular test group will only be exposed to the variant of the characteristic that pertains to that test group. A member of a test group should not be exposed to two different variants of a characteristic as this may generate errors in the test results. In addition to forming a test group for each variant of a characteristic, a control group may also be included as one of the test groups. The control group may receive a control variant of the characteristic being tested or even no variant at all, e.g., the characteristic being tested is omitted completely from a webpage for members of the control group.

As indicated, the test configuration module 106 allows a website provider to determine the number of users accessing the web server module 102 that will participate in a given test. Preferably, the number of users participating in a test may be determined by defining a percentage of all of the users accessing the website. For example, the participants in a test may be predefined as 5% of all of the users accessing the web server module 102. Alternatively, all of the users accessing the web server module 102, i.e., 100% of the users, may participate in a given test.

As mentioned, the number of test groups for a given test typically corresponds in number to the number of variants of the characteristic that will be tested, which may or may not include a control group. The test configuration module 106 may further allow a website provider to define the number of participants in each test group for a test. That is, the users that will be subjected to a given test may be divided evenly or unevenly among the test groups.

The website provider typically selects the number of participants in each test group as a percentage of the overall total of test participants, i.e., 100%, such that the percentage of participants in all of the test groups for a given test totals 100%. For example, assuming that a given test has three different variants of a characteristics that will be tested, the test will have three test groups, namely, Test Group A, Test Group B, and Test Group C. Once the number of test groups has been determined, the website provider may apportion the test participants among Test Group A, Test Group B, and Test Group C by indicating a percentage of the overall total, i.e., 100%, for each test group. Thus, the website provider may select Percentage A, Percentage B, and Percentage C, for Test Group A, Test Group B, and Test Group C, respectively, with the proviso that Percentage A+Percentage B+Percentage C equals 100%. This proviso will ensure that all of the participants in a test is assigned to a test group.

Once the percentage of users in each of the test groups has been defined, the test configuration module 106 associates each of the test groups to a portion of the numerical range from 0 to 100 based on their respective percentages. Using the above example, Test Group A, Test Group B, and Test Group C would each be associated with the following portions of the numerical range of 0 to 100: Test Group A would correspond to the interval (0, Percentage A); Test Group B would correspond to the interval (Percentage A, Percentage B+Percentage A); and Test Group C would correspond to the interval (Percentage B+Percentage A, 100). Thus, it will be appreciated that each test group of a test is associated with a variant of a characteristic that will be tested and a portion of a numerical range.

The test configuration module 106 is further operable to associate a unique test value with each test that will be run on the website hosted on the web server module 102. Preferably, the unique test value associated with each test is a prime number having at least five digits. The test configuration module 106 may call upon the number generation module 108 to generate and provide the unique test value. As will be explained in more detail hereinafter, the requirement that the unique test value for each test be a prime number ensures that if two tests are running concurrently, or even at different times, that the placement of users into the test groups for each of the tests will be independent of each other.

The placement module 114 is operable to assign users accessing the website to a particular test group for a test to which the user will be exposed. This assignment procedure will now be explained in more detail. Whenever a user requests a webpage that includes a characteristic that is undergoing testing, sometimes referred to herein as a "testable characteristic," the placement module 114 uses a predetermined function to determine a test placement value for the user. The test placement value may then be utilized to determine which test group the user falls into by comparing the test placement value to the numerical range associated with the test. In particular, the $$100 \times \frac{(n \mod p)}{p} = \text{Test Placement Value}$$

predefined function uses the random number and the unique test value for the test to which the user is about to be exposed to place the user into a test group. In one embodiment of the present invention, the predefined function comprises: where n is the random value received from the user and p is the unique test value associated with the test and "mod" represents an operation that returns the remainder of n divided by p. It will be appreciated that the above predefined function will return a result falling within the numerical range of 0 to 100. It will be further appreciated that because each test has its own unique prime test value, that the test placement values determined for a given user and two different tests will be probabilistically independent of each other, in that knowing the value of the above predefined function for one test value p and a given n does not provide any significant information about the probability distribution for the values of the above predefined function with a different test value p and the same n. It will be further appreciated that this holds true even though the same random value is used to place a given user into multiple tests.

In continuation of the above example involving Test Group A, Test Group B, and Test Group C, suppose that Test Group A is assigned 20% of the test participants, and Test Group B is assigned 50% of the test participants, and Test Group C is assigned 30% of the test participants. Further suppose that a user has been assigned a random value of 123456789 and the unique test value associated with the respective test is 10009. Using the above predefined function, the test placement value for the user is 57.

The ranges corresponding to each of the tests groups will then determined to be the following: Test Group A would correspond to the interval (0, 20); Test Group B would correspond to the interval (20, 70); and Test Group C would correspond to the interval (70, 100). Since the test placement value of 57 falls into the range for Test Group B, the user with the random value of 123456789 falls into Test Group B. Thus, this user will be exposed to the variant of the test corresponding to Test Group B. The placement module 114 may call upon the calculation module 112 to calculate the test placement value of the users.

Once a particular variant of a characteristic undergoing testing has been identified for a given user, the web server module 102 will then serve a version of the requested webpage to the user that includes that particular variant of the characteristic. The web server module 102 will further notify a tracking module 116 to track the response of the user to the test exposure. Alternatively, the communications module 110 may send a notification to a third party tracking system 122 with information regarding which of the users have been exposed to a given test. The purpose of the tracking module 116 or the third party tracking system 122 is to determine which one of the variants of a testable characteristic is the most effective by comparing the behavior of the users in the different test groups.

It will be appreciated that storing the random value assigned to each user in a cookie ensures that each time the user re-accesses the website hosted on the web server module 102, that the user can be placed in the same test group if a test is still ongoing. Further, storing the random value assigned to each user in a cookie ensures that the user is placed randomly into each test being run on the website.

Figure 3:
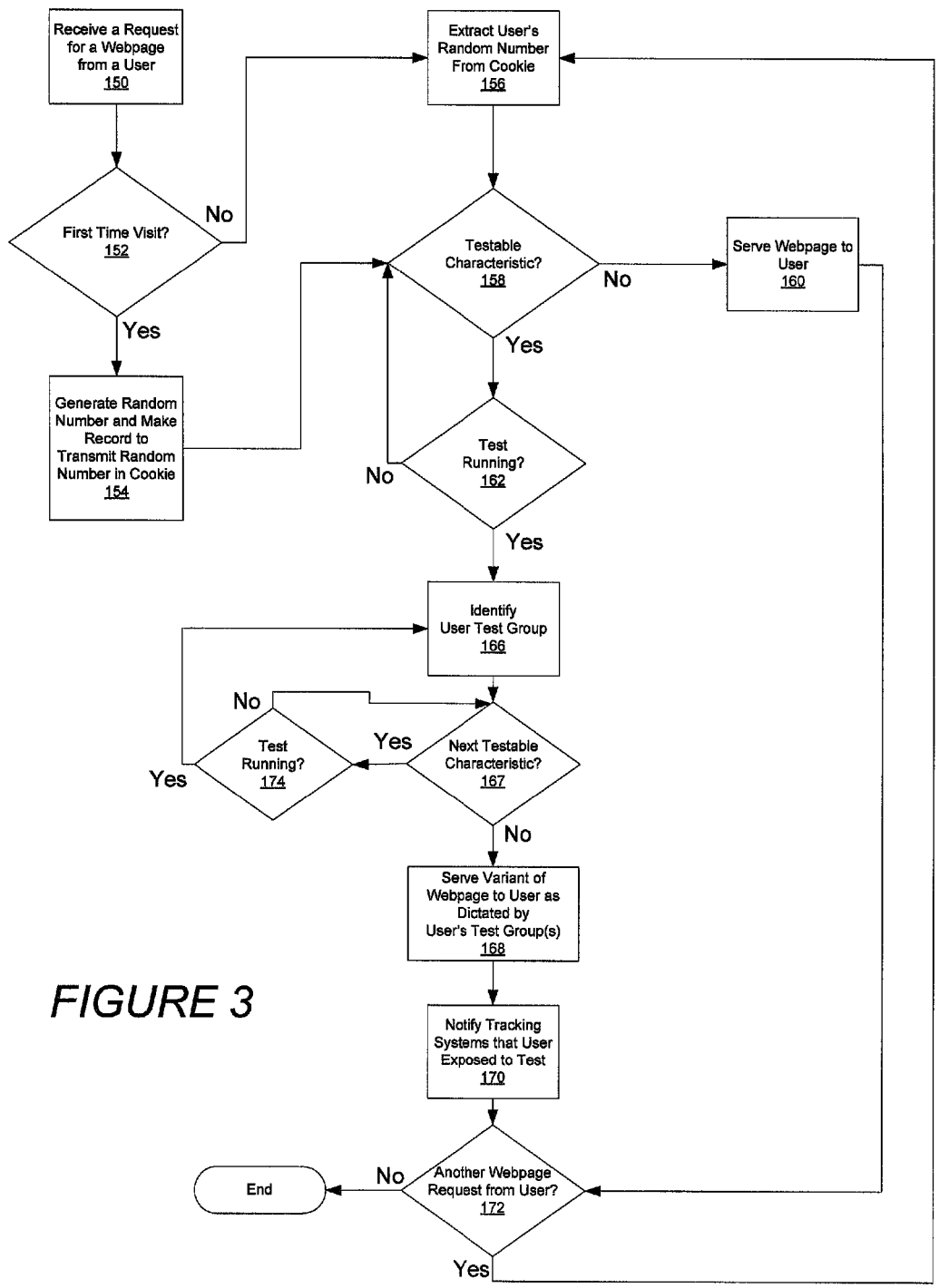
FIG. 3 is a flow chart detailing the process of placing a computer user into a test group.

FIG. 3 is a flow chart detailing the process whereby the system 100, as depicted in FIG. 1, places a user into a test group. At step 150, the web server module 102 receives a request for a webpage of the website from the user. The web server module 102 will then determine if it is the user's first visit to the website at step 152. If it is the user's first visit, the web server module 102 calls the number generation module 108 to generate and return a random value at step 154. At the same step 154, the web server module 102 will then make a record to transmit the random value to the user in a cookie at the next available opportunity. If at step 152 it is determined that it is not the user's first visit to the website, then at step 156, the web server module 102 will extract the user's random number from a cookie associated with the website that was received from the user in association with the request for the webpage at step 150.

After both steps 154 and 156, the web server module 102 determines at step 158 if the requested webpage includes a testable characteristic, i.e., a characteristic of a webpage that may be tested. If not, then at step 160, the web server module 102 will serve the webpage to the user, which may include a default variant for any testable characteristic 158 that is not currently being tested. In addition, at step 160, the web server module 102 will transmit the random number generated at step 154 to the user in a cookie, if necessary. If the requested webpage includes a testable characteristic, the web server module 102 will then determine if there is a test currently running on this testable characteristic at step 162. If there is no test currently running, the process will loop from step 162 back to step 158 and the web server module 102 will determine if there is another testable characteristic on the webpage.

If the testable characteristic is currently undergoing a test, then at step 166, the placement module 114 determines a test group for the user. The placement module 114 uses a unique test value previously associated with the test running on the testable characteristic and the random number to determine a test placement value for the user. The placement module 114 may call upon the calculation module 112 to calculate the test placement value using a predefined function.

Once the test placement value has been obtained, the user is assigned to a test group based on the test placement value. In particular, the test placement value is compared to a numerical range, where each of the test groups has been associated with a portion of the numerical range. Where the test placement value falls in the numerical range determines the test group into which the user will be placed.

At step 167, the web server module 102 determines if the requested webpage includes a next testable characteristic. A next testable characteristic is another characteristic of the webpage that may be tested. If yes, then at step 174, the web server module 102 determines if a test is currently running on the next testable characteristic. If a test is currently running, the process loops from step 174 back to step 166 and the web server module 102 will determine a test group for the user for the next testable characteristic. Again, the placement module 114 uses a unique test value previously associated with the test running on the next testable characteristic and the random number to determine a test placement value for the user. The test placement value may then be used to place the user into a test group for the next testable characteristic.

If a test is not currently running on the next testable characteristic, then the process loops from step 174 back to step 167 and the web server module 102 will determine if there is another next testable characteristic on the webpage. The web server module 102 will repeat this process until the user has been assigned to a test group for each of the testable characteristics on the webpage currently undergoing a test. Once the user has been placed into a test group for each of the testable characteristics on the webpage currently undergoing a test, the process exits step 167 to step 168.

At step 168, the web server module 102 will serve a version of the requested webpage to the user that includes all of the variants associated with the test groups into which the user has been placed. In addition, at step 168, the web server module 102 will transmit the random number generated at step 154 to the user in a cookie, if necessary. At step 170, the tracking module 116 is notified that the user has been exposed to one or more tests. Alternatively, the communications module 110 may notify the third party tracking system 122 that the user has been exposed to one or more tests. If at step 172 the web server module 102 receives a request for a different webpage from the user, the process will loop back to step 156.

It will be appreciated that as used herein, the term "user" may refer to individuals using the access devices 124 or to the access devices 124 themselves. It will further be appreciated that the number of access devices 124 accessing the server 102 may be virtually unlimited, although not all of the access devices 124 may attempt to access the server 102 at the same time.

In the foregoing Detailed Description, the various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function and manner of operation, assembly, and use may be made without departing from the principles and concepts set forth herein.

What is claimed is:

1. A computer-implemented method of conducting a test on a testable characteristic of a webpage transmitted to a plurality of users, said method comprising: assigning the test a unique identification value;
    generating a plurality of random numbers using a number generation module;
    transmitting one of the plurality of random numbers to each of the plurality of users over a computer network;
    receiving a random value and a request for the webpage from each of the plurality of users over the computer network;
    and
    determining a function that uses the random value received from the user and the unique identification value for the test to which the user is exposed to place into a test group;
    serving a version of the webpage to the each user that includes a variant of the testable characteristic as dictated by the test group to which the user pertains.

2. The method of claim 1, wherein said unique test value is a prime number.

3. The method of claim 2, wherein said unique test value comprises at least five digits.

4. The method of claim 1, wherein the function comprises (n mod p), where n is the random value received from the user and p is the unique test value associated with the test.

5. The method of claim 1, wherein the function comprises:

$$100 \times \frac{(n \bmod p)}{p}$$

where n is the random value received from the user and p is the unique test value.

6. The method of claim 1, wherein the function comprises:

$$\frac{(n \bmod p)}{p}$$

where n is the random value received from the user and p is the unique test value.

7. The method of claim 1, further comprising the step of transmitting a random value to each of the plurality of users such that said random value is stored in a computer readable memory of said user.

8. The method of claim 1, further comprising the step of transmitting a random value to each of the plurality of users as part of a cookie.

9. The method of claim 1, wherein said random value is not generated by the user.

10. The method of claim 1, further comprising the step of notifying a tracking system that each of the plurality of users has been exposed to the variant of the testable characteristic corresponding to the test group to which the user pertains.

11. A computer-implemented method of running a plurality of tests on a website, a plurality of users accessing said website, said method comprising the steps of:
    (a) associating a unique test value with each of the plurality of tests;
    (b) defining test groups for each of the plurality of tests;
    (c) receiving a random value from each user accessing the website; and
    (d) placing each of the plurality of users that will be exposed to a given test into a test group for the given test based upon the random value received from that user and the unique test value associated with the given test; associating a numerical range with each of the plurality of tests; and assigning the test groups to a portion of the numerical range of the test to which they pertain.

12. The method of claim 11, further comprising the step of transmitting a random value to each of the plurality of users accessing the website and causing the random value to be stored in a computer-readable memory of the user.

13. The method of claim 12, further comprising the step of causing the random value to be stored in memory at each of the plurality of users in a cookie.

14. The method of claim 11, wherein step (d) further comprises the steps of:
   calculating a test placement value from a function that uses the random value and the unique test value for the given test;
   placing the user into the test group assigned to the portion of the numerical range into which the test placement value falls.

15. The method of claim 14, wherein the function comprises (n mod p), where n is the random value and p is the unique test value.

16. The method of claim 14, wherein the function comprises:

$$100 \times \frac{(n \bmod p)}{p}$$

where n is the random value and p is the unique test value.

17. The method of claim 14, wherein the function comprises:

$$\frac{(n \bmod p)}{p}$$

where n is the random value and p is the unique test value.

18. The method of claim 11, further comprising the step of notifying a tracking system of each of the plurality of tests to which each of the plurality of users has been exposed.

19. A computer program on a non-transitory machine-readable storage medium for running a test on a website, said computer program comprising: a test configuration module for associating a unique test value with the test; a number generation module for generating a random number; a server module for transmitting the random value to a user accessing the website and causing the random value to be stored in a computer-readable memory local to the user; said server module further operable to receive the random value back from the user each time the user accesses the website; a calculation module for determining a test placement value based on the random value received back from the user and the unique test value using a predefined function; and a placement module for assigning the user to a test group of the test based upon the test placement value; wherein said server module is further operable to send a version of a webpage to the user that includes a variant of the test corresponding to the test group to which the user has been assigned.

20. The computer program of claim 19, wherein the predefined function comprises (n mod p), where n is the random value and p is the unique test value.

21. The computer program of claim 19, wherein the predefined function comprises:

$$100 \times \frac{(n \bmod p)}{p}$$

where n is the random value and p is the unique test value.

22. The computer program of claim 19, wherein the predefined function comprises:

$$\frac{(n \bmod p)}{p}$$

where n is the random value and p is the unique test value.

23. The computer program of claim 19, further comprising a tracking module for tracking an exposure of the user to the test.

24. The computer program of claim 19, wherein the unique test value is a prime number.

25. The computer program of claim 19, wherein the number generation module is further operable to generate the unique test value associated with the test.

26. A computer-implemented method of conducting a test on a testable characteristic of a webpage, said method comprising:
   receiving a random value and a request for the webpage from a user;
   determining a test group for the user using said random value;
   serving a version of the webpage to the user that includes a variant of the testable characteristic as dictated by the test group to which the user pertains;
   determining the test group for the user using said random value and a unique test value associated with said test in a function;
   wherein the function comprises:

$$100 \times \frac{(n \bmod p)}{p}$$

where n is the random value received from the user and p is the unique test value.

27. A computer-implemented method of conducting a test on a testable characteristic of a webpage, said method comprising:
   receiving a random value and a request for the webpage from a user;
   determining a test group for the user using said random value;
   serving a version of the webpage to the user that includes a variant of the testable characteristic as dictated by the test group to which the user pertains;
   determining the test group for the user using said random value and a unique test value associated with said test in a function;
   wherein the function comprises:

$$\frac{(n \bmod p)}{p}$$

where n is the random value received from the user and p is the unique test value.

* * * * *